July 14, 1964  H. HARRIS  3,140,792
PRESSURE VESSEL CLOSURE MEMBER
Filed May 23, 1958  10 Sheets-Sheet 1

FIG.1.

Inventor
Herbert Harris
By Pennie
Edmonds, Morton Barrows & Taylor
Attorneys

July 14, 1964 H. HARRIS 3,140,792
PRESSURE VESSEL CLOSURE MEMBER
Filed May 23, 1958 10 Sheets-Sheet 6

Inventor
Herbert Harris
By Pennie Edmonds
Morton Barrows & Taylor
Attorneys

July 14, 1964 H. HARRIS 3,140,792
PRESSURE VESSEL CLOSURE MEMBER
Filed May 23, 1958 10 Sheets-Sheet 8

Inventor
Herbert Harris
By Pennie Edmonds
Morton Barrows & Taylor
Attorneys

July 14, 1964 H. HARRIS 3,140,792
PRESSURE VESSEL CLOSURE MEMBER
Filed May 23, 1958 10 Sheets-Sheet 9

FIG.11.

Inventor
Herbert Harris
By Pennie Edmonds
Morton Barrows & Taylor
Attorneys

July 14, 1964   H. HARRIS   3,140,792
PRESSURE VESSEL CLOSURE MEMBER
Filed May 23, 1958   10 Sheets-Sheet 10

FIG.12.

Inventor
Herbert Harris
By Pennie Edmonds
Morton Barrows & Taylor
Attorneys

United States Patent Office 3,140,792
Patented July 14, 1964

3,140,792
PRESSURE VESSEL CLOSURE MEMBER
Herbert Harris, London, England, assignor to Babcock & Wilcox Limited, London, England, a British company
Filed May 23, 1958, Ser. No. 737,377
Claims priority, application Great Britain May 28, 1957
19 Claims. (Cl. 220—24)

This invention relates to removable closure members for pressure vessels and to a method of manufacture thereof and is of particular utility in connection with a closure member of large diameter pierced by a multiplicity of holes.

Commonly end closure members of cylindrical pressure vessels are of dished, for example hemispherical, form. When such a closure member is of massive construction to withstand high pressure and holes parallel to the axis of the pressure vessel are required near the periphery of the closure member, such openings pass through the closure member at a very acute angle to the adjacent part of the wall of the member. To overcome this difficulty, a flat end may be adopted, but in that event the thickness required to give the necessary strength and rigidity may be so great that no rolled plate is available, whilst if recourse is had to casting, there is a danger that the size of the casting may give rise to unacceptable casting flaws.

An object of the present invention is the provision of a strong, light closure member suitable for closing a relatively large opening in a pressure vessel. A further object is the provision of a method of fabricating such a closure member by fusion welding. Further objects and advantages of the invention will be apparent from the subsequent description of three embodiments of the invention.

The invention will now be described, by way of example, with reference to the accompanying partly diagrammatic drawings, in which.

Referring first to the embodiment of FIGURES 1 to 10, the pressure vessel includes a cylindrical body part 1A arranged with its longitudinal axis vertical, a lower hemispherical part 1B closing the lower end of the body part 1A, and a removable cover member or lid 3. The body part 1A is of 12 feet 5 inches outside diameter, the overall height of the pressure vessel is approximately 35 feet, and the vessel body part has a wall thickness varying from place to place in the range 5½ inches to 6½ inches. The vessel is designed to retain an internal pressure of 1,200 pounds per square inch and its weight is of the order of 220 tons.

Figure 1:
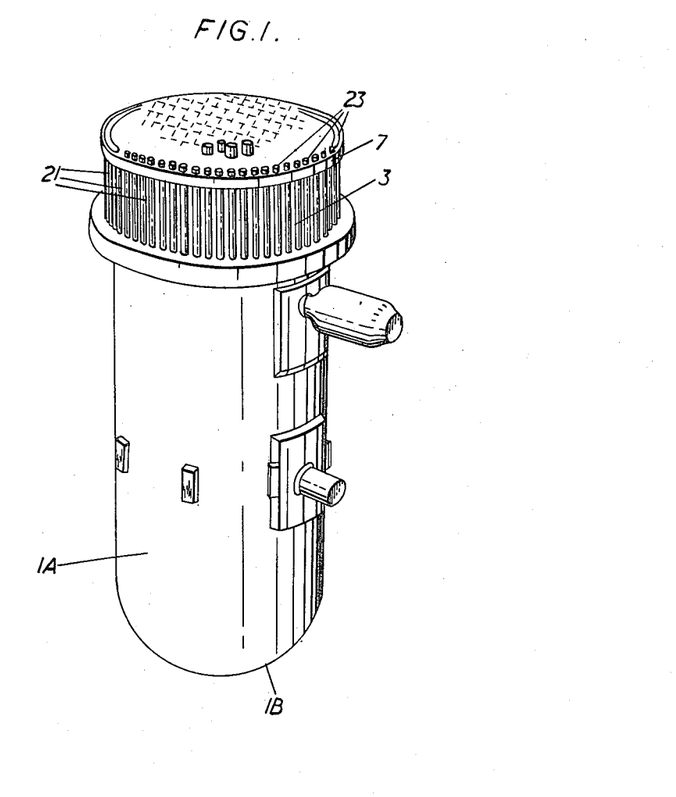
FIGURE 1 is a perspective external view of the core-containing pressure vessel of a nuclear reactor of the pressurized water type complete with a removable top closure member.
Figure 2:
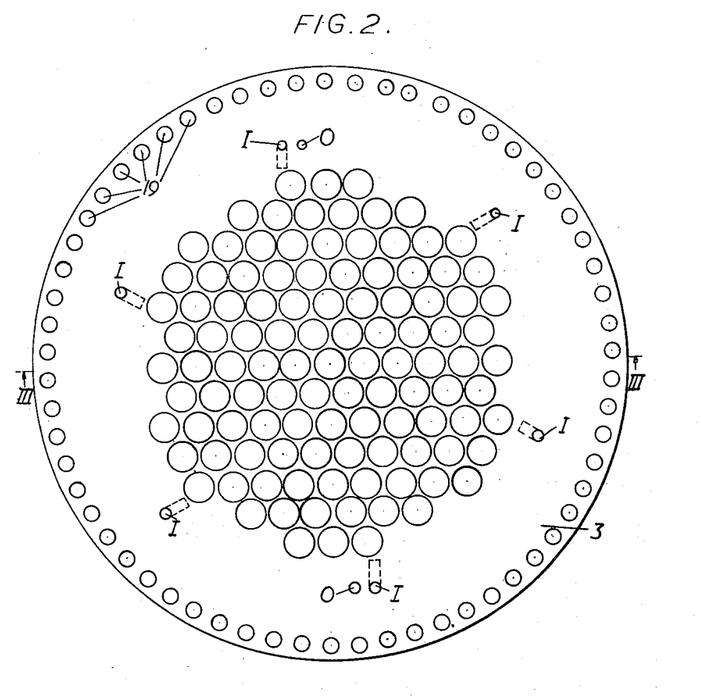
FIGURE 2 is a plan view of the closure member, removed from the body of the pressure vessel.
Figure 3A:
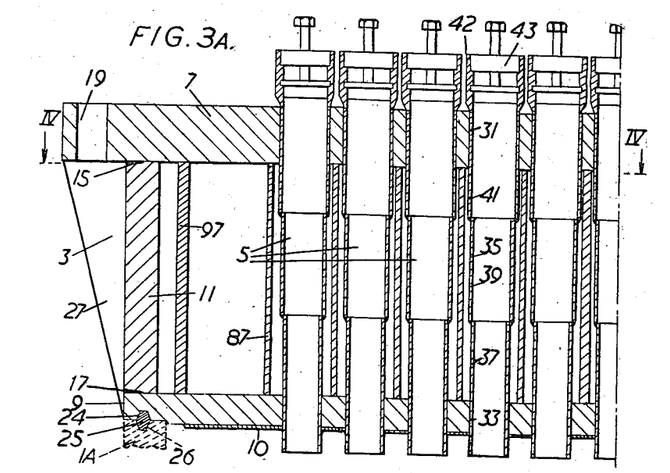
FIGURES 3A and 3B together form a sectional front elevation of the closure member, taken on the line III—III of FIGURE 2.
Figure 3B:
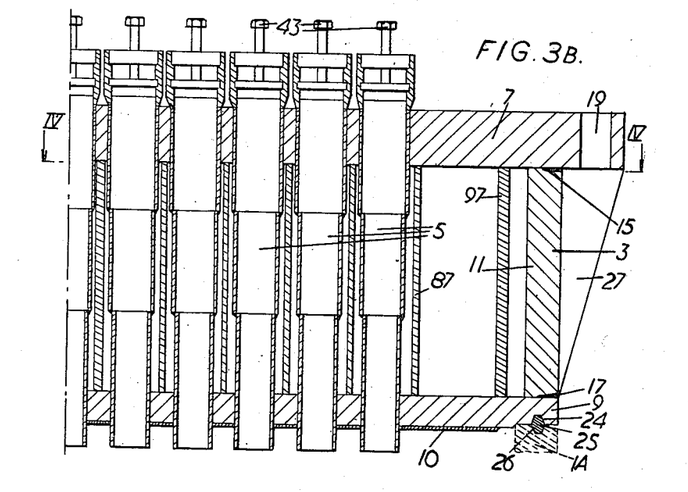

The present invention relates to the construction of the cover member 3, and the only relevant feature of the remainder of the pressure vessel is the arrangement within the body part 1A of a grid-like arrangement of a number of vertically extending fuel elements and reactor control rods. Such arrangements are well known in the art, and in the present case a requirement of the design of the reactor pressure vessel was that access should be provided to the various channels in the reactor core in which the fuel elements and control rods were situated without the need for removal of the cover member 3. To meet this requirement, it was necessary that a grid-like arrangement of charge tubes or ports 5 (see FIGURES 3 and 4) should extend normally through the cover member 3.

Cover member 3 includes an upper flat, round plate 7 of high tensile steel and 8½ inches thick and a lower flat, round plate 9, also of high tensile steel, which is 5⅛ inches thick and is of somewhat smaller diameter, the plates being arranged parallel to one another with a space of approximately 3 feet between them. A mild steel plate 10 having a thickness of ⅛ inch is welded to the bottom surface of plate 9 and is of slightly smaller diameter than that plate. A metal ring 11 built up of four 5 inch thick 90 degree arcuate sections secured together by welds 12 and with an outer diameter equal to that of the lower plate 9 is arranged coaxially with both plates and secured by circumferentially continuous welds 15 and 17 respectively to the two plates 7 and 9. The part of the upper plate 7 which overhangs the ring 11 is formed about its periphery with a large number of circumferentially spaced bolt holes 19 for the reception of the upper ends of stud bolts 21 which are secured at their lower ends to the body part 1A and carry nuts 23 by which the cover member 3 is drawn down on to the body part. The lower face of the plate 9 is formed with a groove 24 into which is fitted a soft iron sealing ring 25. This ring is of oval cross section with its longer axis vertical when fitted in place and deforms as the nuts 23 are tightened to fill the groove 24 and a complementary groove 26 on the body part 1A to provide a fluid tight seal. The overhanging part of the upper plate 7 is stiffened by triangular gusset plates 27 welded along their upper edges to the upper plate 7 and along their vertical edges to the ring 11.

Figure 4:
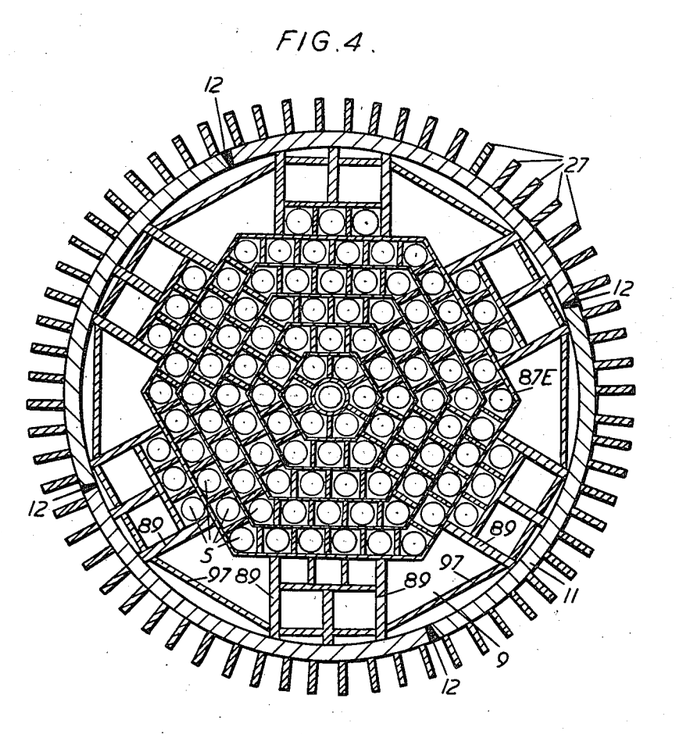
FIGURE 4 is a sectional plan view taken on the line IV—IV of FIGURES 3A and 3B.
Figure 5:
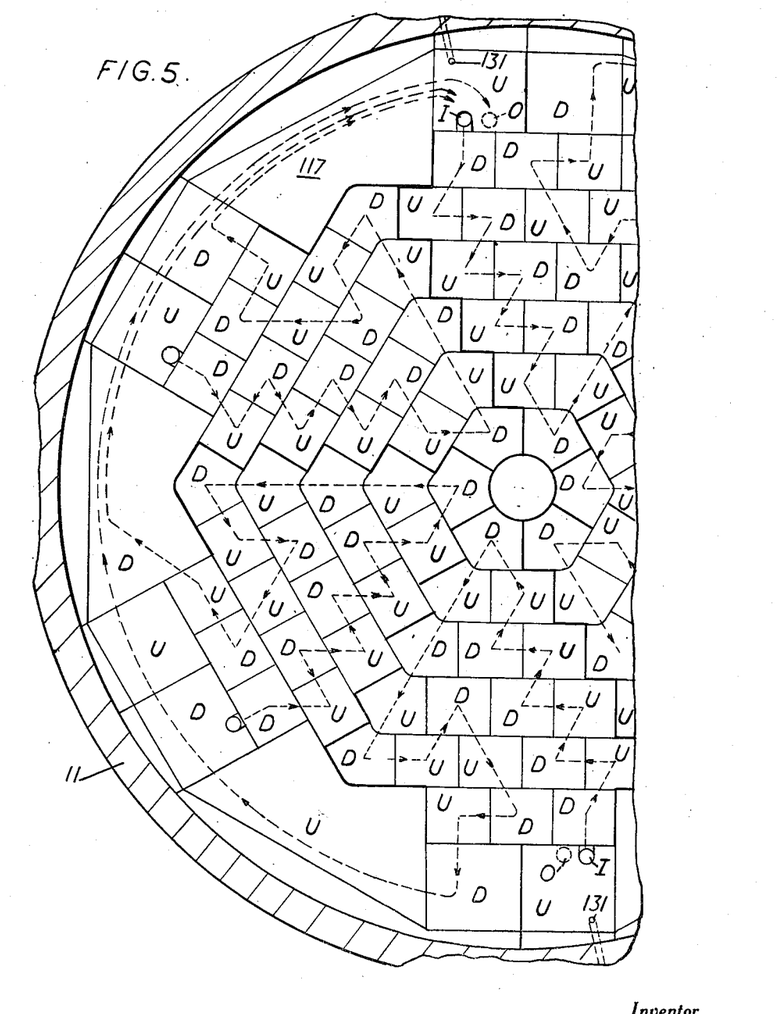
FIGURE 5 is a diagram corresponding to the left-hand side of FIGURE 4, but drawn to a larger scale, showing the manner of flow of cooling water through compartments in the closure member.

The arrangement of the ports 5 can be seen from FIGURE 4, and the detailed construction of representative ports can be seen in FIGURES 3A, 3B, 8 and 9. Thus in FIGURE 3A, for one of the ports 5, upper plate 7 and lower plate 9 are formed with aligned holes 31, 33 and a composite port assembly 35 is fitted to extend through these holes. The assembly 35 comprises a lower tube length 37, an intermediate tube length 39 of somewhat larger diameter, an upper tube length 41 of still larger diameter and a thick walled top closure section 42. The three tube lengths, which are of mild steel, are welded together and the lower and upper tube lengths are expanded in place to form fluid tight seals between the assembly and the lower and upper plates 9, 7 respectively, the section 42 being welded to the tube length 41. A seal weld is formed between the lower tube length 37 and the mild steel plate 10. Each closure section 42 is provided with removable plug means 43 which can be tightened to prevent escape of fluid from within the pressure vessel through the tube assembly to the atmosphere. As will be seen from FIGURES 8 and 9, the plug means 43 comprises a plug 45 of such size that it can slide freely into the closure section 42 and formed at its upper end with an annular recess to provide an upwardly facing, upwardly and inwardly inclined, circumferential shoulder 47. The inner surface of closure section 42 is formed, immediately below the top of plug 45 when that plug is in its operative position, with a circumferential grove 49 into which may be fitted the five parts of a segmented shear ring 51 (see FIGURE 9). When these segments are in place, they are held against radially inwards movement by the upper part of the plug 45, and they serve as an abutment for a circumferentially continuous metal backing ring 53. A soft iron sealing ring 55 is positioned between the shoulder 47 and the backing ring 53.

Figure 8:
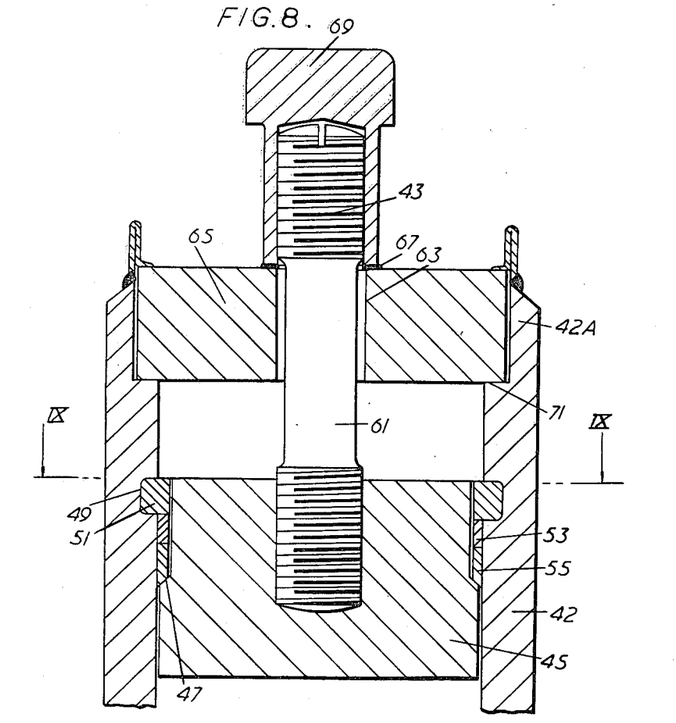
FIGURE 8 is a sectional side elevation of one of a plurality of plug members shown in FIGURES 3A and 3B, but drawn to a much larger scale than in those figures.
Figure 9:
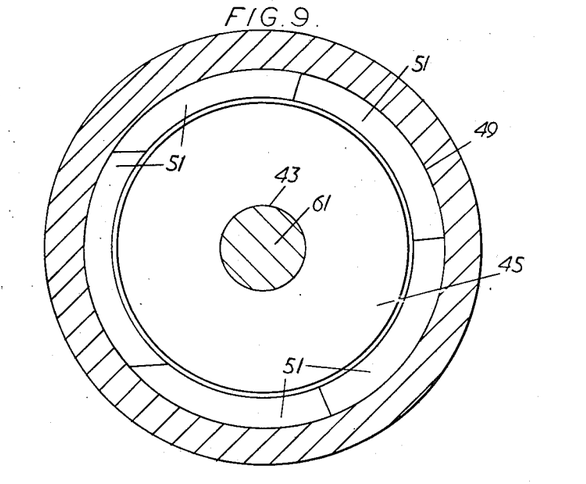
FIGURE 9 is a sectional plan view taken on the line IX—IX of FIGURE 8.

A stud 61 screwthreaded at each end is screwed into and locked within the plug 45 and extends upwardly from the plug through central aperture 63 of a disc-like clamping head 65, above which is a copper-asbestos sealing washer 67 threaded on the stud 61 and a nut member 69 screwed onto the upper end of the stud 61. The uppermost part 42A of the closure section 42 is formed of somewhat greater bore to provide an upwardly facing shoulder 71, and the clamping head 65 is of such size that it enters the enlarged bore but is engaged by shoulder 71.

When plug means 43 are in position as shown in FIGURE 8, the stud 61 is drawn upwardly by the nut member 69 through the clamping head 65, and draws the plug 45 upwardly so that its shoulder 47 engages the sealing ring 55 and forces it against the backing ring 53, which is supported by the ring 51. This forms a fluid tight seal between the plug 45 and the wall of the closure section 42.

Figure 6:
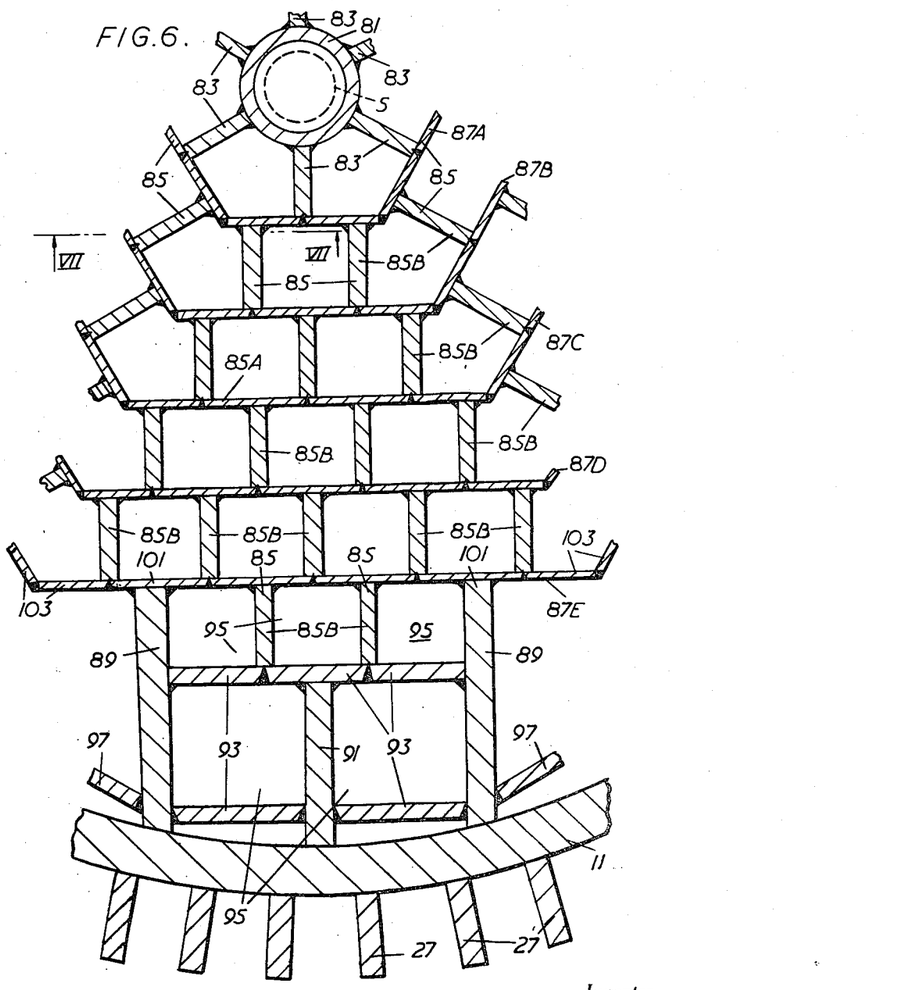
FIGURE 6 is a lowermost sector of FIGURE 4 drawn to a larger scale than in that figure, ports shown in FIGURE 4 being omitted from this figure.

The two plates 7 and 9 are formed into what is the equivalent of a webbed beam by metal pieces extending between the two plates and united to them, these pieces being arranged as a cellular grid. FIGURE 4 shows the general form of this cellular grid while FIGURE 6 shows the manner in which the grid is built up. The peripheral ring 11 acts as coupling means rigidly uniting the plates 7 and 9.

Surrounding the central port 5 is a tubular piece 81 from which radiate at equal angles six radial plates forming arms 83. About these arms 83 are assembled a multiplicity of T-shaped three limbed pieces 85, each arranged with its head 85A nearer the centre of the closure member than the third limb 85B, these pieces 85 being welded to one another and to the outer ends of the radial arms 83 so that, as seen in FIGURE 4, they form five concentric hexagons, indicated in outward succession by 87A, 87B, 87C, 87D, 87E, radially adjacent hexagons being linked by the third limbs 85B of the pieces 85, to which they are welded. The outermost hexagon 87E is spaced from the ring 11, and between each face of this hexagon and the adjacent part of the ring 11 extend two thick metal plates 89 which are normal to the associated face of the hexagon, a shorter thick radial metal plate 91 extending inwardly from the ring 11 and across plates 93 interconnecting the plates 89, 91 to form five rectangular cells, 95. Each plate 89 is connected to the nearest similar plate associated with an adjacent side of the hexagon 85 by a plate 97 which is positioned adjacent the ring 11. As will be clear from FIGURE 4, the plates 83 and pieces 85 are so arranged as to pass between the ports 5.

The method of manufacture of the closure member includes forming the flat plates 7, 9 of high tensile steel, providing the lower flat plate 9 on its lower side with the plate 10 to form a facing of mild steel which retains a substantial degree of ductility after a welding operation, uniting by welding the pieces such as pieces 85 of the cellular grid construction, the ring 11 and the plates 7 and 9, stress relieving the closure member and after the stress relieving operation machining or completing the machining of the annular groove 24 for the sealing ring 25 in the lower face of the lower flat plate 9 and welding, at inner end parts thereof, to the said facing the lower ends of the charge tubes 5 threaded through respective apertures 31, 33 in the flat plates 7, 9.

Figure 10:
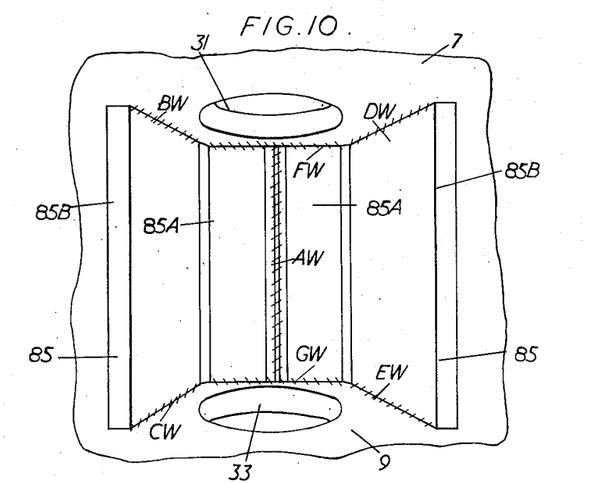
FIGURE 10 is an internal view of a small section of the cover during its fabrication.

Reference to FIGURES 6 and 10 will facilitate an understanding of the manner in which such a cellular grid construction can be built up. The upper plate 7 and the lower plate 9 are first secured in the desired spaced relationship by a number of temporary struts tack welded to the plates about their periphery. The pairs of aligned holes for the ports 5 are then drilled in the desired locations. If desired the proposed positions of the members of the cellular grid arrangement may be marked up in any suitable manner upon the lower plate in order to facilitate the work of the welder in making the assembly. It will be appreciated that the space between the two plates 7 and 9 is some 3 feet high, and the size of this space, together with the prior provision of the holes for the ports 5, renders it possible for a welder to crawl in between the two plates and make efficient welds. As a lower limit, a plate spacing of 15 inches would be necessary for ordinary manual welding access. It will be appreciated that where pieces are to be welded to upper plate 7 or lower plate 9, or to other pieces, the edges of the pieces are appropriately bevelled or otherwise formed in known manner before placing into position to facilitate the welding operation.

The welder inserts the short central tubular piece 81 into the position shown in FIGURE 6, secures it in position by at least one tack weld, and then makes a complete circumferential weld between the top end of the piece 81 and the upper plate 7 and a second complete circumferential weld between the bottom end of the piece 81 and the lower plate 9.

He then inserts the radial arms 83, securing each in place by at least one tack weld, and then welding each arm along both sides to the tubular piece 81 and, on both sides, along its top to the upper plate 7 and along its bottom to the lower plate 9.

The T-pieces 85, in order to facilitate the welder's work, are prefabricated from two flat plates welded together at right angles. If desired, they may be rolled T-shaped members. At each corner of each hexagon of the arrangement, it will be seen that two short head portions of two unbalanced heads 85A are joined together, this being necessary to maintain the uniform pitching of the ports 5 at the corners of the hexagons. The inner hexagon 87A is thus made up of twelve unbalanced head T-pieces 85, which are assembled into the positions shown and tack welded into place. FIGURE 10 shows how one of the open ended cells so formed appears, and the various joints to be welded are lettered off in the order in which the welds are made. First the vertical weld AW, joining the heads 85A of the two T-pieces 85 and the outer end of arm 83 is made. Next the horizontal weld BW joining the left-hand T-piece to the upper plate 7, followed by the horizontal weld CW joining that T-piece to the lower plate 9. In a similar manner, welds DW and EW joining the right-hand T-piece to the upper and lower plates are then made. Lastly the welds FW and GW, joining respectively the top and the bottom of the heads 85A of the two T-pieces to the upper and the lower plates, are made.

Once the innermost hexagon 87A is fully welded, the next hexagon 87B is built up, each face of this hexagon consisting of one unbalanced head T-piece on each side of a balanced head T-piece, the various T-pieces being tack welded into position and then the various welds carried out as described for the innermost hexagon. The welds between the long head limbs of these T-pieces will penetrate into the third limb 85B of the adjacent piece. The third and forth hexagons are built up in a similar manner.

The method described above for building up the cellular grid may be summarised as centrally positioning between and welding to the plates means including a series of equiangularly spaced radiating arms, positioning in the space three-limbed pieces so that adjacent the end of each arm are the extremities of limbs of two pieces and that the pieces form an endless series co-axial with the plates and affording a further series of radiating arms, welding the pieces to the adjacent arms and to the plates and similarly providing between and welding to the plates at least one additional endless series of pieces co-axial with the plates with extremities of limbs of pairs of adjacent pieces respectively welded to arms of the neighbouring inner endless series of pieces and with limbs affording a yet further series of radiating arms.

When the fourth hexagon 87D has been built up, each face of that hexagon presents five outwardly extending limbs 85B of the T-pieces 85 used in the fourth hexagon. At each face two further, balanced head T-pieces 85 are used to bridge the central three limbs 85b, to which they are welded, and form part of the fifth hexagon 87E. To each side of these T-pieces, a flat plate 101 is welded to two of the limbs 85B and a flat plate 103 is welded to the outermost limb 85B and to the nearer corresponding plate 103 of the adjacent wall of the outer hexagon 87E. This completes the outer hexagon 87E.

The two thick plates 89 are now put into position, tack welded in at least one place each, and each secured, on each side, to one of the plates 101 by vertical welds and to the upper plate 7 and to the lower plate 9 by horizontal welds. Three plates 93 are arranged parallel to the hexagon face to bridge the spaces between the two outermost T-piece limbs 85B and the plates 89, and are welded into position. Plate 91 is then welded to the central plates 93, two more plates 93 fitted between the plates 89 and 91 near their outer ends, and welded to these plates and to the upper and lower plates 7 and 9. The plates 97 are then inserted and welded into position. The temporary struts are now cut away from the periphery of the plates 7 and 9.

The four sections of the ring 11 are assembled into position and the welds 12, 15 and 17 made, and finally the gusset plates 27 welded into place.

Means are provided for cooling the cover member 3 by a through flow of water, and as a corollary, means are provided for venting air from the closure member so that it may be filled with water and means are provided for fully draining the closure member. It will be appreciated that with the cellular construction of closure member described above it is necessary for the cooling water to flow from cell to cell and, to ensure as far as possible an absence of dead spots in the circulatory system, the flow is arranged for the most part to be upwards through one cell, downwards through the next serially connected cell, upwards through the next cell, and so on. As will be seen from FIGURE 2, the cover member 3 is provided in its upper plate 7 with six water inlet connections I severally associated with the corresponding six sections of the hexagonal cellular grid, and two diametrically opposite water outlet connections O. From each of the six water inlet connections I a short pipe serves to lead cooling water into the upper end of an adjacent cell (see FIGURE 5). The water then flows along a zig-zag path indicated by the dotted line in FIGURE 5, in the direction of the arrow heads, at first in a generally radially inwards direction across the cover member, and then in a generally radially outwards direction. The method of flow in each cell is indicated by either the letter "D," where it is downward, or by the letter "U," where it is upward. It will be seen that there are six water flows, each starting from one of the inlet connections I as a separate water flow but the three flows in one half of the cover member joining as a common peripheral flow to one of the water outlets, O, while the other three flows in the second half of the cover member combine in a similar manner as a common peripheral flow to the second of the water outlets O. Due to the number of cells in the cover member 3, it is found necessary for the combined flows in the penultimate flow chamber 117, and those in the diametrically opposite penultimate flow chamber, to be non-rising and non-falling. In view of the rate of water flow in each of these two chambers, where the three flows are combined, this purely horizontal flow can be tolerated. The trapping of steam in the chamber 117 and its diametrically opposite equivalent chamber is prevented by the presence of air vents described below.

Figure 7:
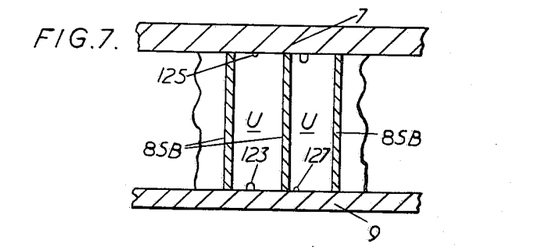
FIGURE 7 is a sectional side elevation taken on VII—VII of FIGURE 6.

To permit the flow of cooling water through a wall dividing one cell from the next, that wall is formed, at either top or bottom as appropriate, with a flow aperture giving a flow area of about 1 square inch. In FIGURE 7 are indicated a top flow aperture at 121 and a bottom flow aperture at 123. To permit venting of air from every cell, every cell wall which is provided at its bottom with a flow opening 123 is provided at its top, above opening 123, with an air vent 125 having a flow area of about 1/16 of a square inch; and to permit draining of every cell, every cell which is provided at its top with a flow aperture 121 is provided at its bottom, below the aperture 121, with a drain opening 127, having a flow area of about 1/16 of a square inch. Each of the upflow compartments provided at its upper surface with a flow water outlet O is also provided with a draining duct 131 formed in the lower plate 9 and leading to valved water disposal means outside the cover member. The various flow apertures 121, 123, air vents 125 and drain openings 127 are cut out from the T-pieces 85, and plates 89, 91, 93, 101 and 103 before the work of assembly is begun. As the various welds are made, care is taken to ensure that these openings are clear before the next weld is started. In view of the small size of the drain openings 127, the interior of each cell must be left quite free from loose particles which might later cause blockage.

In the cover member described above, the peripheral ring 11 serves as strut means rigidly uniting the plates 7 and 9 and the metal pieces welded to both upper and lower plates serve as rigid spacing means which cause the cover member to act as a flanged beam, the outer plate 7 forming the tension flange, the inner plate 9 forming the compression flange, and the rigid spacing means forming the web.

A hexagonal configuration for each endless series of T-shaped pieces 85 is described and shown, and with a triangular pitching of the charge tubes will normally be found desirable, but other polygonal configurations may be adopted if desired.

As described above, a thin mild steel plate is welded to the lower surface of the lower high tensile steel plate 9, and the seal welds at the bottoms of the tube lengths 37 are made with plate 10. With this mode of manufacture the necessity of heat treating the closure member after the welds around the tube lengths 37 have been made is avoided since the mild steel plate will not possess such high hardness value in the heat affected zones as would inevitably occur with the thick high tensile steel plate after a welding operation. There is, therefore, no need to machine or complete the machining of the annular groove 24 after such welds have been made in order to avoid or to compensate for slight distortion of the groove 24 which might occur as the result of such heat treatment.

Figure 11:
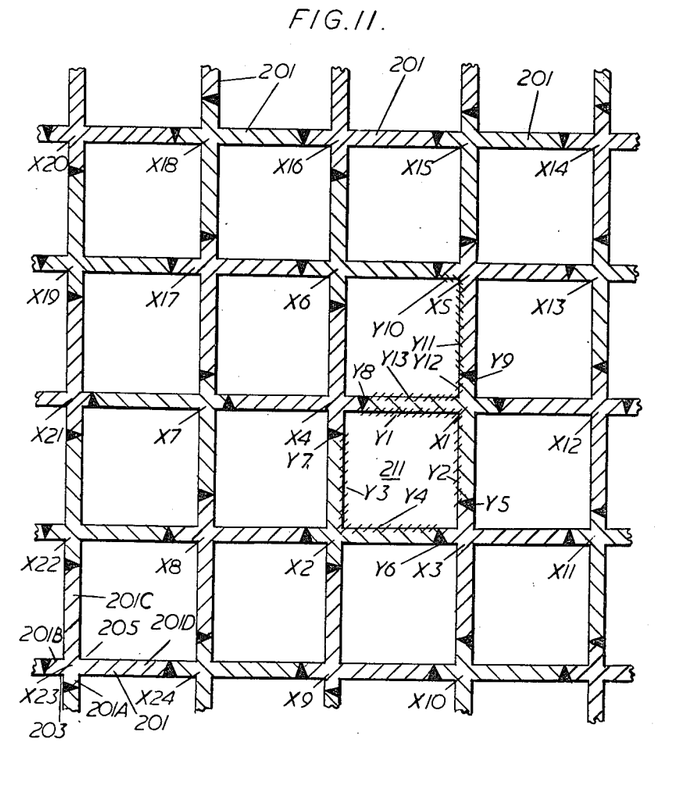
FIGURE 11 is a sectional plan view, corresponding to FIGURE 6, through an alternative cover having a rectangular arrangement of ports therein.

In the embodiment of the invention described above with reference to FIGURES 1 to 10, the charge tubes or ports 5 were arranged with triangular pitching, triangular pitching having advantages from the viewpoint of effective ligament strength in the tube plates 7 and 9. The invention may be applied to a cover member in which the charge tubes are arranged with rectangular pitching. FIGURE 11 shows how the cellular construction inside the cover member can be modified to accommodate charge tubes arranged with rectangular pitching.

The cellular grid is built up from a number of X-shaped pieces 201, each having four limbs 201A, 201B, 201C and 201D with the angles 203, 205 included between adjacent limbs being right angles, the limbs 201A and 201B including one angle 203 being short and the limbs 201C and 201D including the other angle 205 being long.

During construction of the cellular grid, a central cell 211 is first made. To do this one of the pieces 201 designated X1 is welded to both upper and lower plates of the cover member (corresponding to plates 7 and 9) along the sides marked Y1, and then along the sides marked Y2. A second piece 201, designated X2, is then placed in position to define an opposite corner part of the cell 211, and welded to upper and lower plates along the sides marked Y3 and Y4, the welder working through the two open corners of the cell. A third piece 201, designated X3, is next placed in position with its two shorter sides respectively aligned with longer sides of the pieces X1, X2 to complete a third corner of the cell, and is secured to the pieces X1, X2 by the vertical welds Y5, Y6 respectively. A fourth piece designated X4 is then placed in position in a similar manner to complete the fourth corner of the cell 211, and secured to the pieces X2, X1 by the vertical welds Y7, Y8 respectively. It will be seen that in this manner the central cell 211 has been built up with only the short arms of the pieces 201 indicated by X3, X4 being precluded from welding to the upper and lower plates on the inside of the cell. It will be understood that even these shorter arms of these pieces 201 will be welded to the upper and lower plates in due course, but this welding will take place only on the sides of the arms outside the cell.

Once the cell 211 has been completed, the other cells may be built up by the addition of further pieces 201 one at a time, after each addition the accessible horizontal joints and vertical joints inside new cells being completed. For example, one may next add piece X5, and effect vertical weld Y9 and horizontal welds along sides Y10, Y11, Y12, and Y13. The other pieces 201 may then be added as described above in the order X6 to X24 in the positions indicated.

In view of the thermal stresses set up in the upper and lower plates by the welding operation, it is normally best to start the building up of the cellular grid from the centre of the plates. Where it is considered permissible to work from one corner of the grid, the process of assembly is somewhat simplified since it is possible to use similar orientations for all the pieces used to build up the grid. For example, in FIGURE 11, starting with piece X23, one can weld along the longer arms, then add piece X22 similarly orientated, and weld along its longer limbs. X24 would need to be turned to the same orientation before it was added, and likewise other pieces. Such a progressive build up of the cellular grid has the advantage of simplicity and, in all cells, the accessibilty of both sides of all pieces with the exception of one side of each of the two shorter arms.

Figure 12:
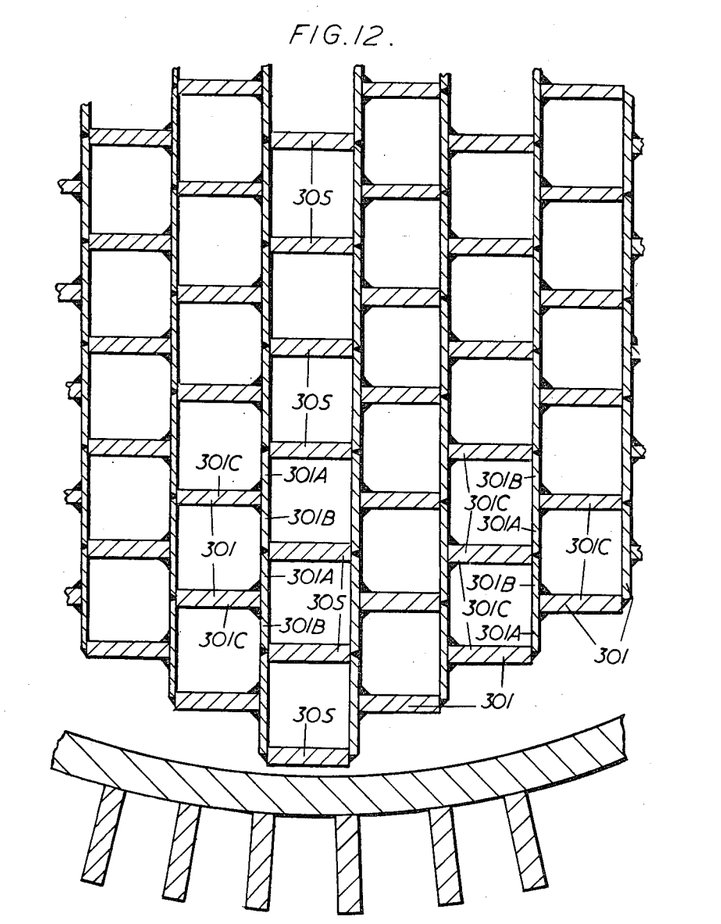
FIGURE 12 is a sectional plan view, corresponding to FIGURE 6, through an alternative cover in which a modified form of cellular grid is provided.

In a modification of the cellular grid construction of FIGURES 1 to 10, plates of three-limbed form define parallel lines of cells substantially throughout the space between the flat plates 7, 9. Thus, as shown in FIGURE 12, prefabricated T-shaped pieces 301 are used, the heads of which have first and second limbs 301A, 301B of equal length projecting in opposite directions from the third limb 301C of the T. The cellular grid construction includes rows of pieces 301 in each of which the first and second limbs of the pieces are aligned, the first limb 301A of one piece 301 and the second limb 301B of a neighbouring piece of the row being adjacent and both welded to the end of the third limb 301C of a piece in a next adjacent row. In manufacture, the cellular grid construction is progressively built up in an approximately even manner in all directions from the centre outwards. To permit this to be done, straight strips 305 arranged parallel to one another at such a spacing as to constitute opposite sides of a row of cells are welded to the upper and lower flat plates as a row extending along a diameter of the flat plates. T-shaped pieces 301 are then placed at each side of the row with their first and second limbs 301A, 301B spanning the gaps between adjacent straight strips and with their third limbs 301C projecting outwardly away from the row of strips 305 and are welded to the strips 305 at their ends and also welded to the upper and lower flat plates. Access may then be had to make the welds as the cellular grid construction is built up in opposite directions away from the diametrical row of plates 305, preferably keeping the part assembly circular as viewed in plan.

The T-pieces described in connection with FIGURES 1 to 10 and 12 provide rectangular cells for the charge tubes 5. If desired they may be replaced with three-limbed pieces having straight arms set at angles of 120° and welded together in a manner similar to that used for the T-pieces, but giving a honeycomb cellular grid of hexagonal cells.

The closure members described are relatively light but of great strength, the flat or substantially flat plates and the cellular grid construction respectively being analogous to the flanges and web of an I-shaped beam. At the same time, the provision of a large number of holes passing through the closure member and parallel to the axis of the pressure vessel is rendered possible.

What is claimed is:

1. A removable built-up metal closure member having a multiplicity of spaced access openings therethrough suitable for a large diameter vertically positioned pressure vessel employed as a nuclear reactor comprising two horizontally disposed spaced flat parallel plates each comprising a single monolithic slab of metal, circular in shape, and having a diameter greater than the interior diameter of said pressure vessel, coupling means rigidly uniting the plates adjacent their peripheries at least at spaced points along those peripheries, vertically arranged metal spacing pieces each extending between the plates in the space therebetween inwardly from the coupling means and welded at their upper and lower ends to said plates, said metal spacing pieces having angularly disposed limbs and being arranged to divide the space between said plates into a multiplicity of vertically extending cells each having a substantially uniform cross section throughout its height and being defined on its sides by said limbs of the metal spacing pieces and top and bottom by said plates, many of the cells being remote from the periphery of the closure member and being surrounded by other cells, aligned access openings in said plates providing an upper and a lower opening to each of said cells, vertically disposed tube assemblies sealingly fitted in fluid-tight relationship into said aligned access openings and forming a passageway through said cells opening into said pressure vessel, plug means for sealing the upper ends of said tube assemblies, and apertures in said metal spacing pieces for the circulation of a cooling fluid serially through said cells.

2. A closure member as claimed in claim 1, in which the coupling means is in the form of a continuous ring extending around the outer portions of the flat plates.

3. A closure member as claimed in claim 2, in which one of the plates is of larger diameter than the other plate, a series of gusset plates is welded to the ring and to the larger diameter plate and the larger diameter plate is formed near its periphery with a series of bolt holes for effecting connection with the pressure vessel.

4. A closure member as claimed in claim 1, in which an inlet pipe is arranged to introduce cool water into the space between the two plates, and an outlet pipe is arranged to evacuate heated water from the said space.

5. A closure member as claimed in claim 1 in which said metal spacing pieces in horizontal section are of three-limbed form.

6. A closure member as claimed in claim 5, in which each of the three limbs is straight and the angle between each pair of limbs is at least 90°.

7. A closure member as claimed in claim 5, in which the pieces are of T-shape, and a group of the pieces are arranged with a similar orientation to one another, the two limbs constituting the head of each T-piece being welded respectively to the third limbs of two adjacent T-pieces.

8. A closure member as claimed in claim 7, in which the limbs constituting the head of each T-piece define concentric hexagons the adjacent limbs at the corners of the hexagons being welded together.

9. A closure member as claimed in claim 8, in which at the centre of the hexagons the cell construction includes a tube connected at its ends to the two flat plates and from which extend equiangularly spaced ribs to the outer end of each of which are welded the free ends of two limbs which are members of the limbs of two neighbouring pieces respectively.

10. A closure member as claimed in claim 7, in which a central line of cells of the cell construction is formed by parallel straight metal strips each extending from one flat plate to the other and transversely of the line of cells and by the heads of some of the T-pieces, each such T-piece having its two limbs constituting the head of the T-piece welded respectively to two adjacent metal strips with its third limb on the side of the head remote from the line of cells.

11. A closure member as claimed in claim 7, in which the limbs constituting the head of each T-piece are nearer the centre of the closure member than the third limb.

12. A closure member as claimed in claim 1, in which the metal spacing pieces are of X-shape, each having two adjacent arms which are shorter and two other arms which are longer.

13. A closure member as claimed in claim 1, in which at least two inlet pipes are arranged to introduce cool water into the space between the two plates, and two outlet pipes are arranged to evacuate heated water from the space, the pipes being so disposed that a number of symmetrical and generally radial flows of cooling fluid through the space between the plates are established.

14. A closure member as claimed in claim 13, in which each flow path extends from cell to cell through said apertures in the cell walls, said succeeding apertures in the walls of series connected cells being alternately at the top and at the bottom of the cell walls.

15. A closure member as claimed in claim 13, in which each flow is first in a generally inward direction and then in a generally radially outward direction.

16. A closure member as claimed in claim 13, in which each cell is provided with an aperture in one of the cell walls adjacent one of the flat plates and the apertures are such that, when the closure member is disposed with that flat plate horizontal and uppermost, the escape of air from all the cells is possible.

17. A closure member as claimed in claim 13, in which each cell is provided with an aperture in one of the cell walls adjacent one of the flat plates and the apertures are such that, when the closure member is disposed with that flat plate horizontal and downmost, the draining of cooling fluid from all the cells is possible.

18. A closure member as claimed in claim 17 in which said plates are spaced at least 15 inches apart and are of such a thickness that said plates and spacing pieces are joined together by manual welding performed between said plates.

19. A closure member as claimed in claim 1, in which the flat plate subject to fluid pressure in the pressure vessel is of high-tensile steel and is provided on the side subject to that pressure with a facing of mild steel, and the charge tubes are welded to that facing in a fluid-tight manner.

References Cited in the file of this patent

UNITED STATES PATENTS

| | | |
|---|---|---|
| 2,056,563 | Budd et al. | Oct. 6, 1936 |
| 2,091,981 | Hanson | Sept. 7, 1937 |
| 2,615,688 | Brumbaugh | Oct. 28, 1952 |
| 2,680,901 | Kaiser | June 15, 1954 |
| 2,725,993 | Smith | Dec. 6, 1955 |
| 2,744,064 | Moore | May 1, 1956 |
| 2,765,098 | Tangard | Oct. 2, 1956 |
| 2,814,717 | Hardesty | Nov. 26, 1957 |
| 2,839,825 | Edwards et al. | June 24, 1958 |
| 2,848,404 | Treshow | Aug. 19, 1958 |
| 2,862,694 | Lortz | Dec. 2, 1958 |

FOREIGN PATENTS

| | | |
|---|---|---|
| 789,022 | Great Britain | Jan. 15, 1958 |

OTHER REFERENCES

AECU–3062, December 1955, pp. 62–63.
NPG–9 May 30, 1956, pp. 1–3, FIG. 1 and FIG. 25.